United States Patent [19]

Haferl et al.

[11] Patent Number: 5,083,198
[45] Date of Patent: Jan. 21, 1992

[54] NONLINEAR RGB VIDEO SIGNAL PROCESSING

[75] Inventors: Peter E. Haferl, Adliswil; Thomas H. Sauder, Volketswil, both of Switzerland

[73] Assignee: RCA Thomson Licensing Corporation, Princeton, N.J.

[21] Appl. No.: 583,881

[22] Filed: Sep. 19, 1990

[30] Foreign Application Priority Data

Nov. 10, 1989 [GB] United Kingdom ............... 8925438

[51] Int. Cl.$^5$ .................. H04N 5/202; H04N 5/57; H04N 9/69
[52] U.S. Cl. .................... 358/32; 358/164; 358/169; 358/27
[58] Field of Search .............. 358/32, 29, 21 R, 37, 358/164, 169, 27, 40

[56] References Cited

U.S. PATENT DOCUMENTS

| | | | |
|---|---|---|---|
| 4,038,685 | 7/1977 | Bazin | 358/32 |
| 4,057,828 | 11/1977 | Monahan | 358/32 |
| 4,262,304 | 4/1981 | Faroudja | 358/37 |
| 4,812,905 | 3/1989 | Rossi | 358/32 |

Primary Examiner—Tommy P. Chin
Attorney, Agent, or Firm—Joseph S. Tripoli; Peter M. Emanuel; Frederick A. Wein

[57] ABSTRACT

A nonlinear video signal processing system provides gamma correction to improve rendition of picture details near black. In addition, picture brilliance is improved using a brightness and frequency dependent enhancement circuit providing increased detail signal contrast in bright picture areas. In each color channel, the respective color signal is gradually separated into a low level amplitude signal portion and a higher level amplitude signal portion. The higher level amplitude portion is high-pass frequency filtered. The low level signal portion and the high-pass filtered higher amplitude signal portion are added to the original, linear video signal for producing a combined signal coupled to the kinescope. The low level signal portion is DC coupled to the linear signal and the high level signal portion is AC coupled to the linear signal.

14 Claims, 8 Drawing Sheets

NONLINEAR RGB VIDEO SIGNAL PROCESSING

The present invention concerns nonlinear video signal processing.

BACKGROUND OF THE INVENTION

FIG. 1 shows the gamma of various aspects of a video signal transmission system, with curve 1a representing the transfer characteristic of the transmission side, curve 1b representing the transfer characteristic of the picture tube (CRT), and curve 1c representing the overall transfer characteristic.

The transmitted video signals of the NTSC, PAL and SECAM television (TV) standards have a gamma of 0.45 to 0.5 while the picture tube of color television (CTV) receivers have a gamma of 2.8 to 3.1. As a result, the overall transfer curve (light in to the camera—light out from the picture tube) is not linear and the overall gamma is in practice about 1.35 instead of a unity gamma. This implies that the exponential transfer characteristic of the picture tube is not fully compensated, leading to compression of the dark picture portions of the display. Such compression causes picture details near black to be lost, and colored areas to fade to black. Concurrently, whites are excessively amplified with respect to the dark portions to the point of often reaching picture tube saturation and blooming. A linear overall transfer characteristic avoids this black compression and can be obtained by an additional gamma correction of 0.8 in each of the red, green, and blue (R, G, and B) amplifiers in the television receiver. However, picture tubes have a relatively small dynamic range of light output which cannot be enlarged without reaching picture tube saturation causing blooming. Therefore, gamma correction to increase amplification of dark image areas causes a signal compression of the high signal level whites. This is illustrated by FIG. 2a showing a gamma corrected ramp signal. Peak white must be kept at the same level as in the uncorrected case, the dashed line to avoid picture tube blooming. As a consequence, the upper portion of the ramp signal has a reduced slope as shown in FIG. 2b. The viewer perceives this as a lack of contrast in grey to white picture areas resulting in washed out pictures. In such an event, the improvement of contrast of low-brightness portion of the image is obtained at the expense of high-brightness contrast deterioration.

SUMMARY OF THE INVENTION

According to an aspect of the invention, the perceived contrast of an image is improved by non-linear processing of the video signal. More specifically, a video signal is separated into a low level amplitude signal portion (near black) and a higher level amplitude signal portion (near white) for separate non-linear processing of each signal portion. The low-level amplitude signal portion is non-linearly processed and combined with the original linear signal. In accordance with a further aspect of the invention, the higher level amplitude signal portion is non-linearly processed and high-pass frequency filtered, and combined with the original linear signal. In accordance with an even further aspect of the invention, the non-linearly processed low level amplitude signal portion and the non-linearly processed and high pass filtered high level amplitude signal portion are combined with the original linear signal to produce a gamma corrected video signal with enhanced detail signal contrast in the grey to white picture areas.

DESCRIPTION OF THE DRAWINGS

The invention will be described in detail with reference to the drawings in which.

In the figures, corresponding elements are identified by the same reference numbers.

DETAILED DESCRIPTION OF THE PREFERRED EMBODIMENT

Figure 1:
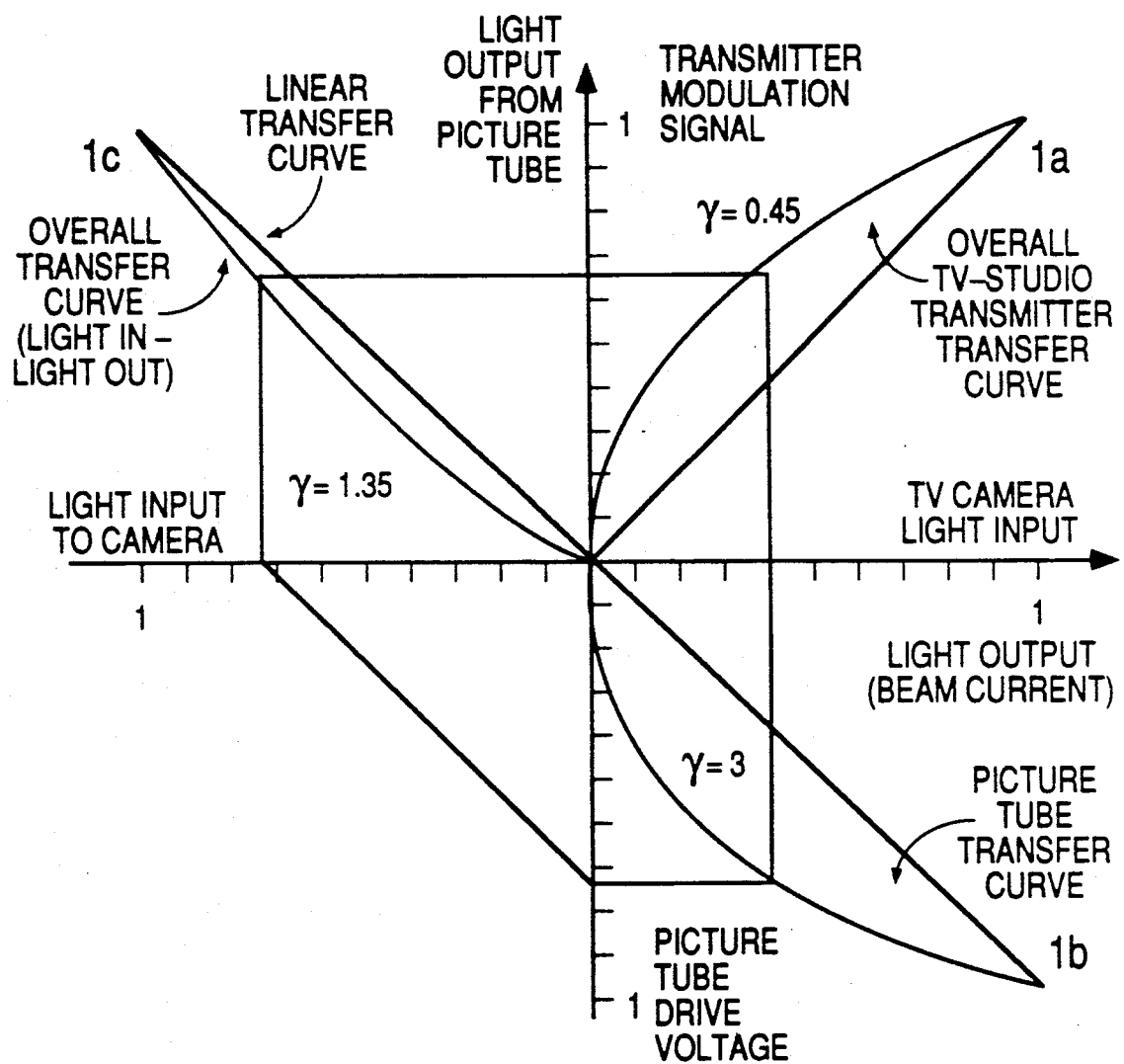
FIG. 1, previously described, shows transfer characteristics of a transmitter, a television receiver, and the overall television system including the transmitter and receiver.
Figure 2:
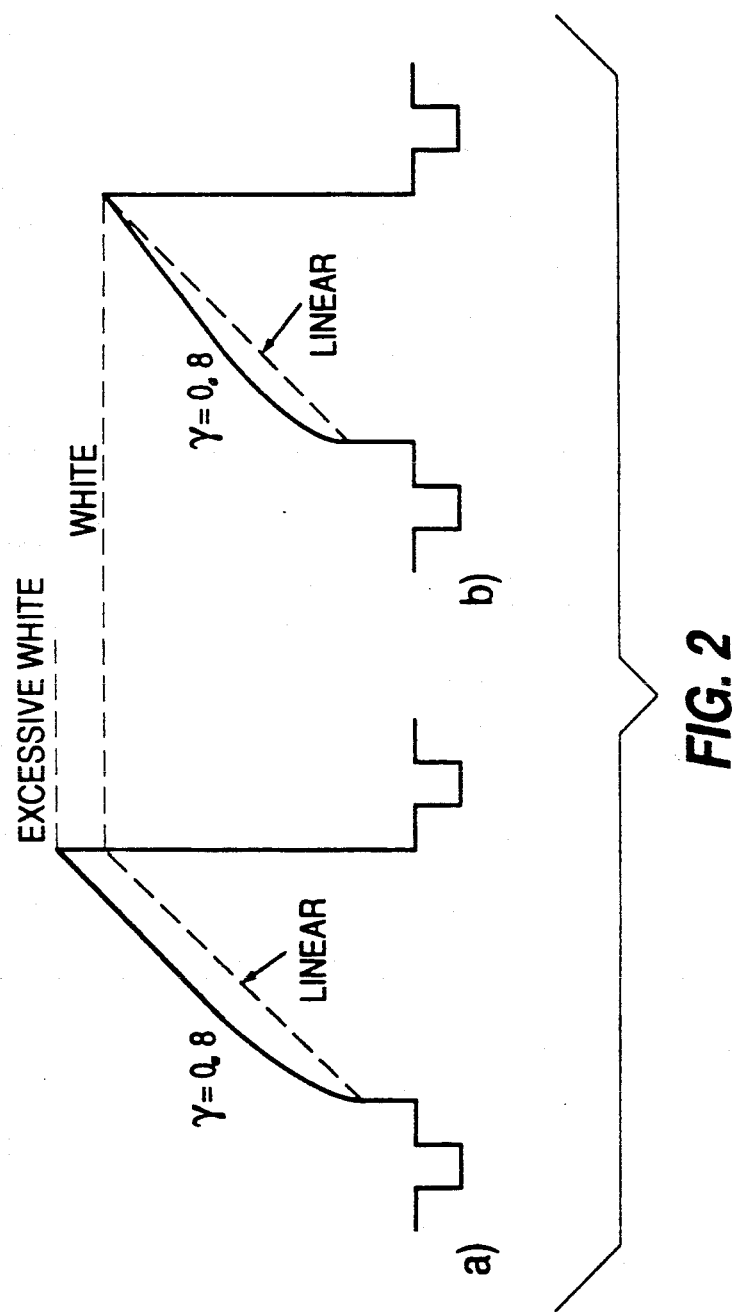
FIG. 2, previously described, shows a graphical representation of a ramp signal which has undergone gamma correction useful in understanding an advantage of the arrangement of FIGS. 3 and 4.
Figure 3:
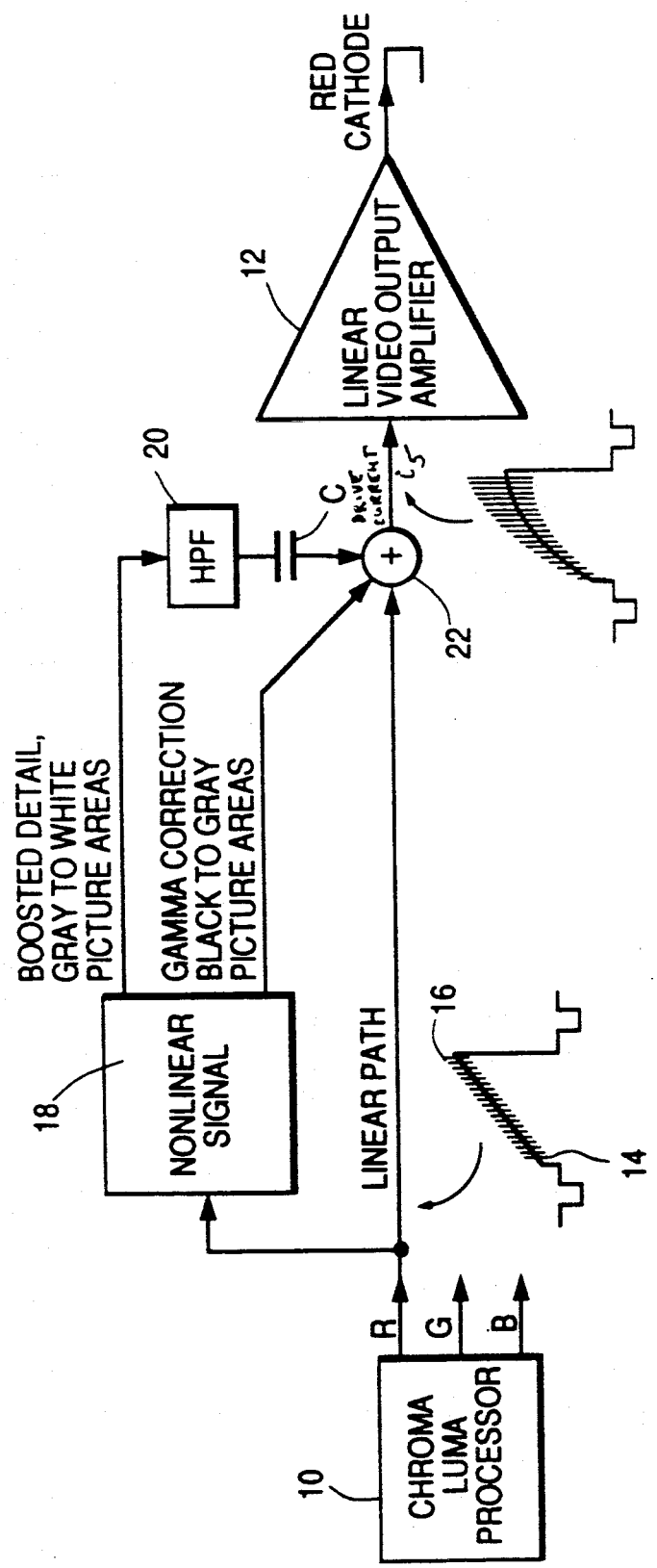
FIG. 3 shows a block diagram representation of an exemplary arrangement according to an aspect of the present invention.

FIG. 3 shows a block diagram representation of the subject arrangement coupled between a luminance-chrominance processor 10 and a video output amplifier 12 of a color television receiver. While similar arrangements are used in the green (G) and blue (B) channels, only the arrangement for the red (R) channel is shown. The R output signal of processor 10 is shown by way of example to be linear ramp 14 with a superimposed detail signal 16 indicated by the short vertical lines. The detail signals 16 are video signals at frequencies higher than 0.5 MHz and correspond to picture details smaller than 1.2 cm in the horizontal direction on a 28 inch screen size color television receiver.

The R signal is coupled to a non-linear or soft signal splitter 18 which "gradually" splits the signal into a low level portion (black to grey picture area) and a high level portion (grey to white picture areas). The high level signal portion is filtered by a high-pass filter 20 which can include capacitor C. The low level signal is DC coupled to an adder 22. The high pass filtered portion of the high level signal is AC coupled to adder 22 through capacitor C. The original R signal, the low level signal portion and the high-pass filtered high level portion are combined by adder 22 to produce the output signal coupled to amplifier 12. The addition of the low level portion (black to grey) to the R signal provides gamma correction. The further addition of the high-pass filtered portion results in contrast enhancement of the high level (grey to white) video detail signal.

Figure 4:
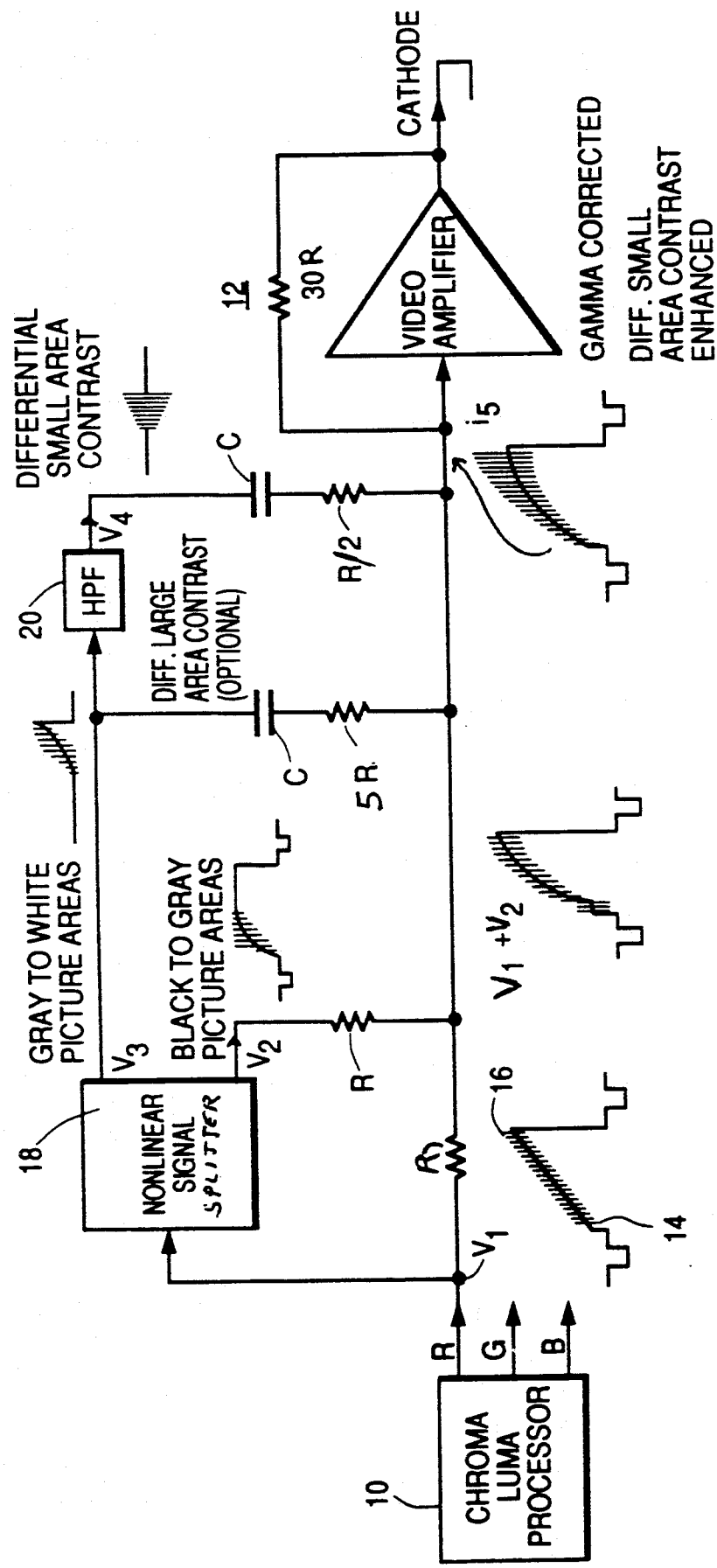
FIG. 4 shows a more detailed block diagram representation of the arrangement of FIG. 3 according to an aspect of the present invention.
Figure 5:
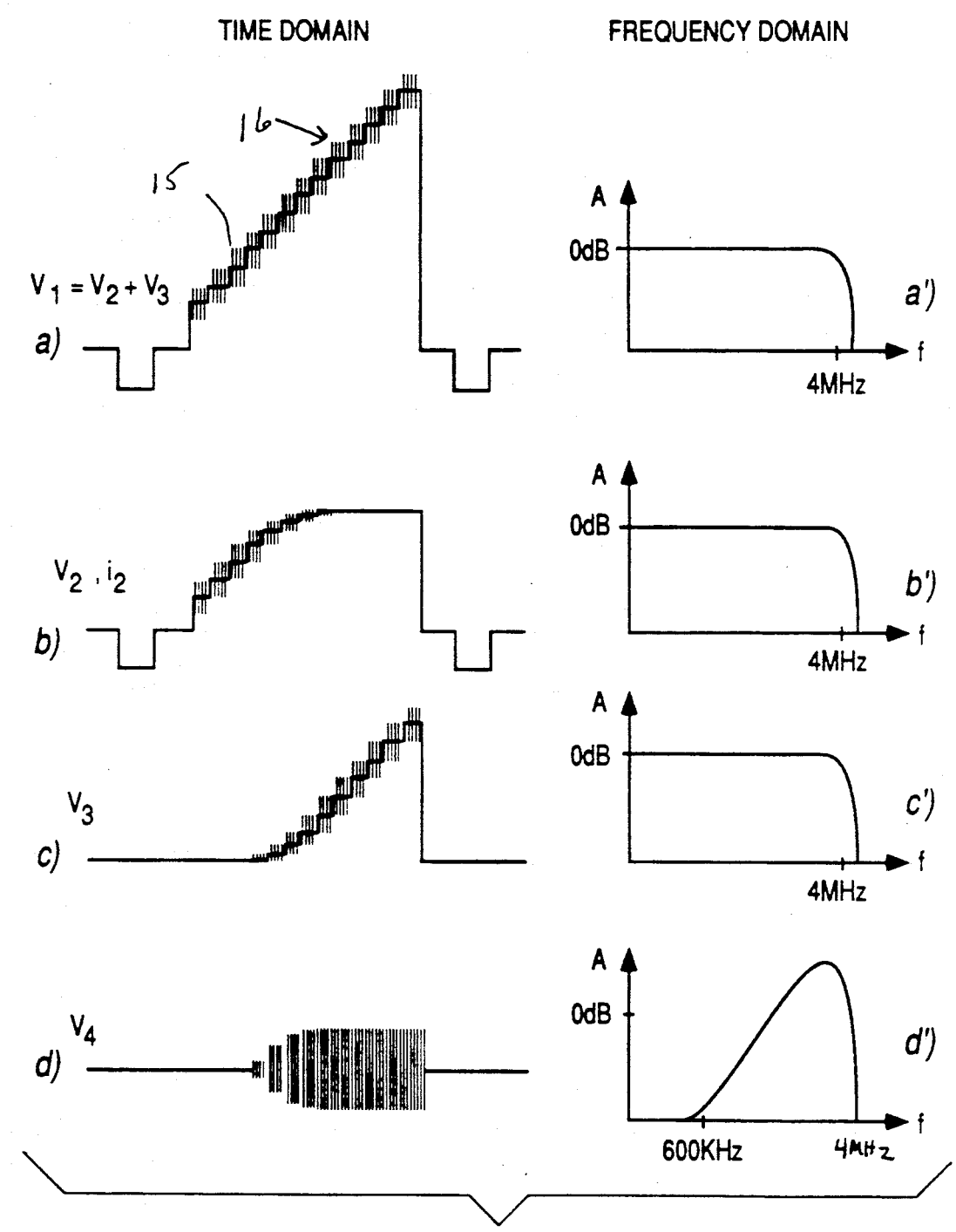
FIGS. 5 and 6 show time and frequency domain waveforms, respectively, useful in understanding the operation of the arrangement of FIGS. 3 and 4.
Figure 6:
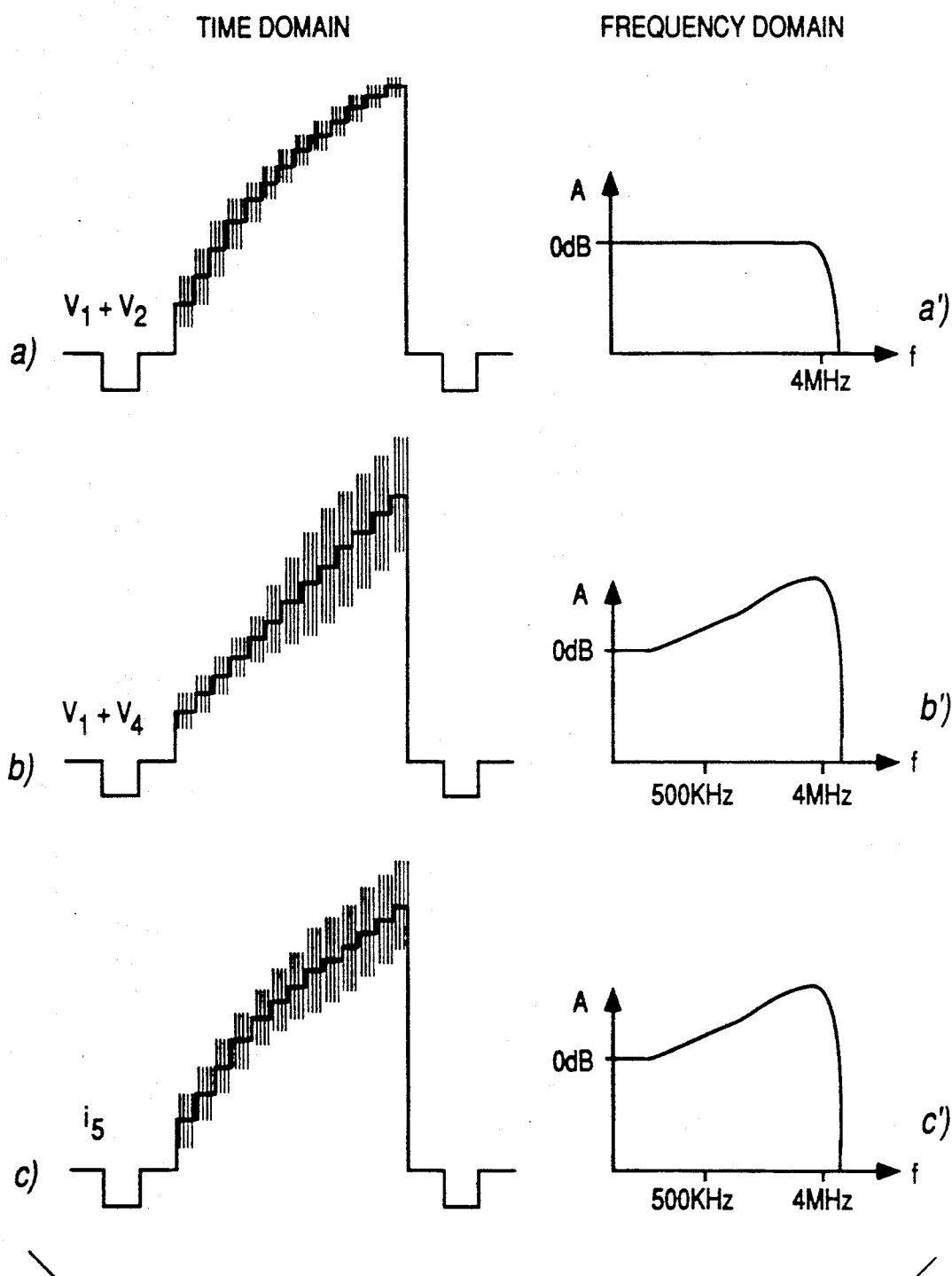

FIG. 4 shows the arrangement of FIG. 3 in greater detail. The waveforms of FIGS. 5 and 6 help illustrate the operation of the arrangement of FIG. 4. Waveform 5a shows the input signal $V_1$ composed of a staircase 15 and a superimposed detail signal 16 at about 2 MHz. Waveforms 5b and 5c show the "soft" signal splitting performed by nonlinear signal splitter 18. Note that the differential amplitude of $V_2$ gradually decreases and that of $V_3$ gradually increases. The sum of $V_2$ and $V_3$ equals the input voltage $V_1$. The frequency response of the signal splitting is flat as shown by the corresponding frequency response curves of FIGS. 5a'–c'. Video output amplifier 12 is driven by voltages $V_1$ and $V_2$ via respective resistors, each of value R. The decreasing differential amplitude of $V_2$ represents a gradual variation of gain of video output amplifier 12 from 60 to 30 corresponding to a gamma of 0.8. This is illustrated in FIG. 6a and a' showing the sum of $V_1$ and $V_2$. The differential amplitude (contrast) decreases gradually toward higher signal levels. A high frequency detail signal $V_4$ is derived by passing $V_3$ through a high-pass filter 20. The output voltage and the frequency response of $V_4$ is illustrated by FIGS. 5d and 5d'. Voltage $V_4$ is coupled capacitively (through capacitor C) to video amplifier 12 for producing the signal $V_1+V_4$ shown in FIGS. 6b and 6b'. A 6 dB boost of the detail signal is obtained by the relatively low value coupling resistor R/2. Coupling capacitor C prevents any brightness signal (DC component) from being added to the input of video amplifier 12. FIGS. 6c and 6c' illustrate the drive current $i_5$ which is similar to the inverted amplifier 12 output voltage. The low frequency staircase signal of FIG. 6c is similar to that of FIG. 6a but the detail signal is strongly boosted to obtain an enhanced contrast of picture details in bright areas. The average beam current does not increase significantly due to the AC coupling. A small amount of $V_3$ is also added through coupling capacitor C and resistor 5R to avoid color desaturation in large, bright picture areas.

Figure 7:
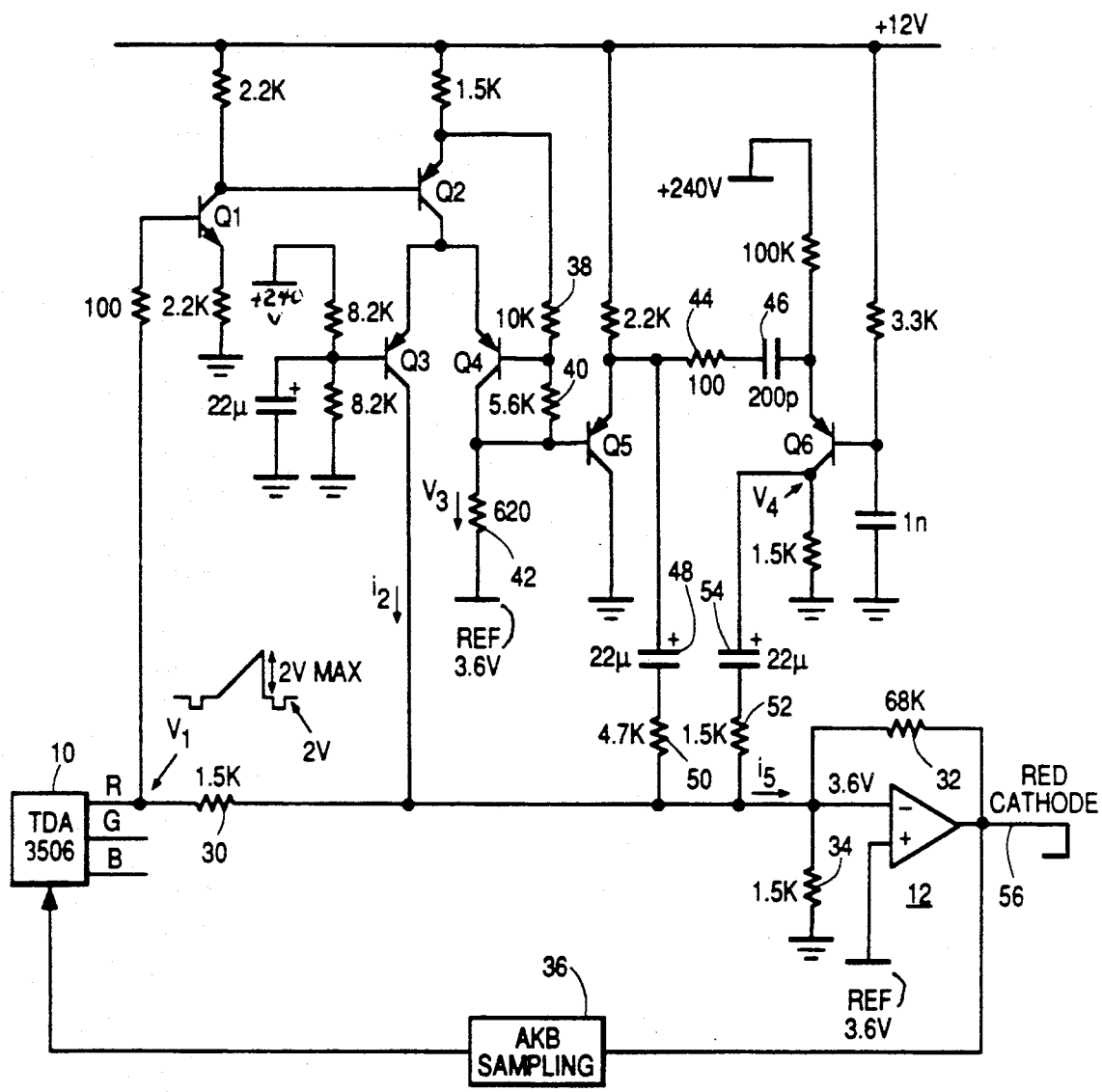
FIG. 7 shows a detailed schematic diagram of a circuit implementation of the arrangement of FIG. 4 according to another aspect of the present invention.

FIG. 7 shows a schematic of an exemplary nonlinear signal processor according to the present invention. RGB processor 10, integrated circuit TDA3506 manufactured by, e.g., the Phillips Corporation of the Netherlands, drives video output amplifier 12 via resistor 30. Feedback resistor 32 defines the gain of the amplifier 12. The spot cut-off voltage of the picture tube is set to 150 volts by biasing resistor 34 for the condition when drive current $i_5$ is equal to zero. This condition requires an appropriate CRT grid number 2 adjustment (not shown). Automatic kinescope biasing (AKB) circuit 36 sets the black levels of the outputs of processor 10 such that $i_5$ is zero for a black signal. The bias current of Q3 flows through resistor 30 into processor 10 and causes a black level of 2 volts as indicated at V1.

Transistor Q1 is a unity gain inverter and DC level shifter. Differential amplifier Q2, Q3 and Q4 provide the signal splitting as shown by the waveforms of FIGS. 5b and 5c. The bases of Q3 and Q4 are biased so that for a signal corresponding to a black image, Q3 is conducting and Q4 is cut off. Current source Q2 inverts the signal so that current $i_2$ is in phase with voltage $V_1$.

The increasing ramp voltage $V_1$ generates an increasing ramp current $i_2$ which adds to the drive current $i_5$ into amplifier 12 and produces the gamma correction. Current $i_2$ is of same shape as voltage $V_2$ of FIG. 5b. The emitter voltage of Q2 is coupled to the base of Q4 via resistor 38. The increasing voltage $V_1$ causes the emitter voltage of Q2 to decrease and the base voltage of Q4 decreases until Q4 starts conducting. As a result, voltage $V_3$ of FIG. 5c gradually increases and the slope of $V_2$ gradually decreases. Feedback resistor 40 provides a smooth changeover of the collector current of Q2 between Q3 to Q4 as shown by waveforms 5b and 5c. A further increase of $V_1$ causes $i_2$ to remain constant and $V_3$ to increase at the same rate as $V_1$. This is obtained with Q4 having a gain of one due to the values of resistors 38, 40 and 42.

The separated medium to high level signal $V_3$ developed across resistor 42 is fed to emitter follower Q5 which drives a high-pass filter including a resistor 44 and a capacitor 46. A small amount of $V_3$ signal is fed to the output amplifier 12 via a capacitor 48 and resistor 50. As earlier noted, this AC coupled wide band signal improves color saturation in bright picture areas which otherwise would be slightly desaturated due to signal compression caused by gamma correction. The medium to high level detail signal voltage $V_4$ is amplified by an amplifier including transistor Q6 to obtain a 6 dB boosted detail signal. The detail signal is coupled to the output amplifier 12 via a capacitor 54 and a resistor 52. Also as earlier noted, the advantage of the AC coupling is improved brilliance (contrast of details) without increasing the average beam current and without changing the black level.

Figure 8:
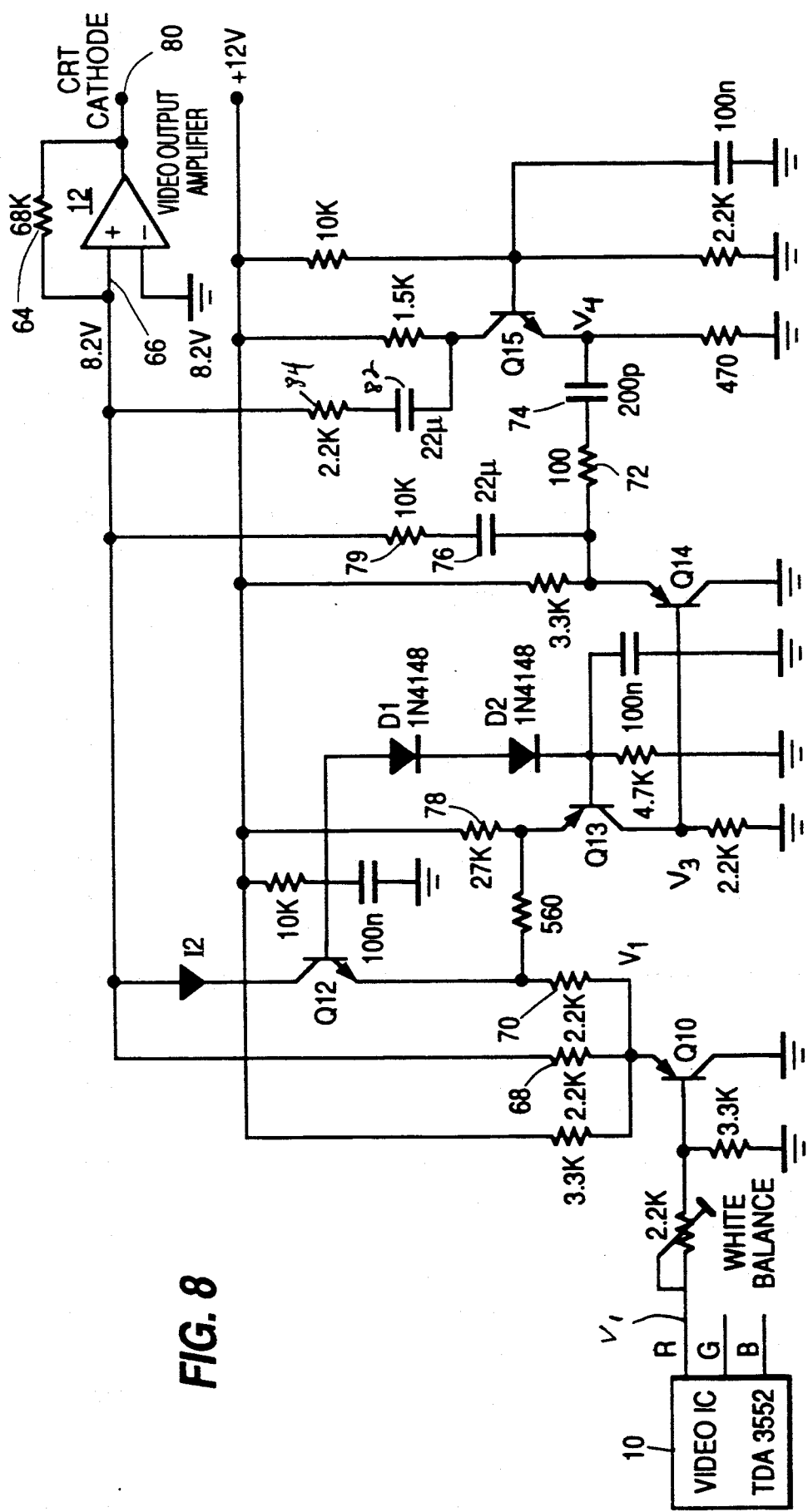
FIG. 8 shows a detailed schematic diagram of the preferred circuit implementation of the arrangement of FIG. 4 according to still another aspect of the present invention.

FIG. 8 shows the circuit diagram of the preferred embodiment of a non-linear video processor according to the present invention using a TDA3552 integrated circuit as signal source 10. The circuit employs an active-load video output amplifier as amplifier 12. Voltage feedback is provided via resistor 64 to obtain a low impedance summing point at its input 66.

An input emitter follower Q10 acts as low impedance source for video voltage $V_1$. The differential pair Q12, Q13 splits the video voltage $V_1$ into the low and high brightness signals $I_2$ and $V_3$. Transistor Q12 fully conducts at signal levels corresponding to very low image brightness. Thus, resistors 68 and 70 are coupled in parallel causing output amplifier 12 to produce a gain of 60. The signal splitting of this circuit produces a drive current I2 in place of voltage $V_2$ shown in FIG. 4.

Transistor Q12 conducts less as $V_1$ increases, and a gain of 30 is reached when transistor Q12 is cut off. The gradual change of gain of the output amplifier, as effected by $I_2$, produces the desired gamma correction. Transistor Q13 starts to conduct before transistor Q12 goes into cut-off at a medium brightness signal level and produces voltage $V_3$ at its collector. Voltage $V_3$ represents picture information containing brightness levels between grey and peak white. Signal voltage $V_3$ is applied to emitter follower Q14 driving a high-pass filter including resistor 72 and capacitor 74. This high-pass filter separates the signal $V_4$ corresponding to grey to white area detail signal used for contrast enhancement. Signal $V_4$ is amplified by transistor Q15 to produce a detail signal which is coupled to amplifier 12 via capacitor 82 and resistor 84. As mentioned earlier, a small amount of the $V_3$ signal is AC fed directly to output amplifier 12 via capacitor 76 and resistor 79.

The bases of transistors Q12 and Q13 are biased at fixed relative potentials established by diodes D1 and D2. A resistor 78 produces a quiescent current of 0.3 mA through transistor Q13, preventing transistor Q13 from being cut off by signal peaks at grey level.

The spot cut-off voltage of the picture tube (not shown) is set to approximately 160 V at the cathode 80 by setting the black level voltage of the emitter of transistor Q10 to 3.5 volts, and by appropriately adjusting the grid No. 2 voltage of the CRT.

The present circuit does not require alignment between the RGB channels to avoid tracking errors. This is due to the gradual signal splitting.

The present arrangement makes use of the fact that the eye appears to be more sensitive to contrast changes in small picture areas, as opposed to changes extending over large areas. Frequencies produced by picture details of medium to high brightness are boosted and AC coupled to the main video signal. This results in a significant improvement of the brilliance without increasing the average beam current. The AC coupling only increases the so-called detail contrast, while DC brightness signals and large area contrast are not affected. The picture tube can be driven to higher beam currents during small area details than during large area signals before picture tube blooming occurs. This improvement of brilliance is of particular importance with very large picture tubes which appear dimmer and less contrasty than smaller tubes because the large tubes are limited by gun, shadow mask, and phosphor to about the same peak beam currents as the smaller tubes while the picture is spread out over a much larger area.

We claim:

1. Video signal processing apparatus comprising:
    means for dividing a video signal into a first signal corresponding to relatively low amplitude levels of said video signal, and a second signal corresponding to relatively higher amplitude levels of said video signal,
    means for high-pass frequency filtering the second signal, and
    means for combining said video signal, said first signal and said high-pass frequency filtered second signal to produce a combined signal.

2. The apparatus of claim 1 wherein the means for dividing gradually divides the video signal into said first and second signals.

3. The apparatus of claim 1 wherein the high-pass frequency filtered second signal is AC coupled to said means for combining.

4. The apparatus of claim 3 wherein the first signal is DC coupled to said means for combining.

5. The apparatus of claim 4 wherein said means for combining comprises an adder.

6. The apparatus of claim 1 wherein the video signal is at least one of red, green, and blue signals.

7. The apparatus of claim 4 wherein at least a portion of said high-pass frequency filtered second signal is AC coupled to said means for combining.

8. Video signal processing apparatus for processing a color video signal comprising:
    means for dividing a color video signal into a first signal corresponding to relatively low amplitude levels of said color video signal, and a second signal corresponding to relatively higher amplitude levels of said color video signal,
    means for high-pass frequency filtering the second signal, and
    means for combining said color video signal, said first signal and said high-pass frequency filtered second signal to produce a combined signal.

9. The system of claim 8 wherein the means for dividing gradually divides the color signal into said first and second signals.

10. The apparatus of claim 8 wherein the high-pass frequency filtered second signal is AC coupled to said means for combining.

11. The apparatus of claim 10 wherein the first signal is DC coupled to said means for combining.

12. The apparatus of claim 11 wherein said means for combining comprises an adder.

13. The apparatus of claim 8 wherein the color signal is at least one of red, green, and blue signals.

14. Video signal processing apparatus for processing a color video signal comprising:
    means for gradually dividing the color video signal into a first signal corresponding to relatively low amplitude levels of said color video signal, and a second signal corresponding to relatively higher amplitude levels of said color video signal,
    means for high-pass frequency filtering the second signal, and
    means for combining said color video signal, said first signal and said high-pass frequency filtered second signal to produce a combined signal.

* * * * *